(12) United States Patent
Bohatsch

(10) Patent No.: US 12,149,130 B2
(45) Date of Patent: Nov. 19, 2024

(54) ARRANGEMENT OF AN ELECTRIC MOTOR HAVING AN ENCODER

(71) Applicant: B & R INDUSTRIAL AUTOMATION GMBH, Eggelsberg (AT)

(72) Inventor: Elmar Bohatsch, Braunau am Inn (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 150 days.

(21) Appl. No.: 17/800,911

(22) PCT Filed: Feb. 19, 2021

(86) PCT No.: PCT/EP2021/054094
§ 371 (c)(1),
(2) Date: Aug. 19, 2022

(87) PCT Pub. No.: WO2021/165439
PCT Pub. Date: Aug. 26, 2021

(65) Prior Publication Data
US 2023/0074502 A1    Mar. 9, 2023

(30) Foreign Application Priority Data
Feb. 21, 2020   (AT) .............................. A 50129/2020

(51) Int. Cl.
*H02K 11/20* (2016.01)
*G01B 7/30* (2006.01)
*G01P 3/44* (2006.01)

(52) U.S. Cl.
CPC .............. *H02K 11/20* (2016.01); *G01B 7/30* (2013.01); *G01P 3/44* (2013.01)

(58) Field of Classification Search
CPC .............. H02K 11/20; G01B 7/30; G01P 3/44
See application file for complete search history.

(56) References Cited

U.S. PATENT DOCUMENTS

| 6,844,692 B1* | 1/2005 | Jasinski | H02K 23/66 |
| | | | 318/446 |
| 2015/0112640 A1* | 4/2015 | Niro | G01D 15/00 |
| | | | 702/183 |
| 2016/0190898 A1* | 6/2016 | Yamashita | H02K 11/225 |
| | | | 310/68 B |

FOREIGN PATENT DOCUMENTS

| CN | 203104203 | 7/2013 |
| DE | 10 2010 027 938 | 10/2011 |
| DE | 10 2010 043 172 | 6/2012 |
| WO | 2017/130268 | 8/2017 |

(Continued)

OTHER PUBLICATIONS

Europe Search Report/Office Action conducted in counterpart Europe Patent Appln. No. 21 707 212.3 (Aug. 16, 2023).

(Continued)

*Primary Examiner* — Zoheb S Imtiaz
(74) *Attorney, Agent, or Firm* — GREENBLUM & BERNSTEIN, P.L.C.

(57) ABSTRACT

In order to reduce the cabling complexity of an electric motor having an encoder, an electric motor which can be connected to a control unit in order to receive an actuating signal from the control unit has an encoder port which is designed to receive an encoder signal from an encoder. Furthermore, the electric motor has a signal port which is designed to transmit the encoder signal to the control unit.

12 Claims, 2 Drawing Sheets

(56) References Cited

FOREIGN PATENT DOCUMENTS

WO 2021/104662 6/2021

OTHER PUBLICATIONS

Figure 1A:
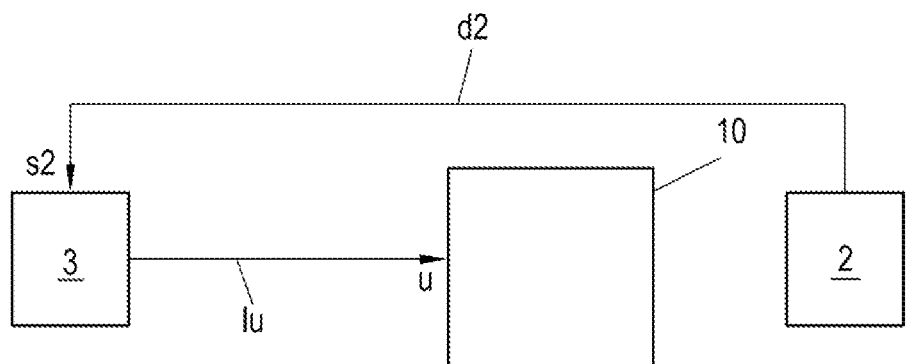

Austria Search Report conducted in counterpart Austria Patent Appln. No. A 50129/2020 (Feb. 21, 2022).
Int'l Search Report (Form PCT/ISA/210) conducted in Int'l Appln. No. PCT/EP2021/054094(May 25, 2021).
Int'l Written Opinion (Form PCT/ISA/237) conducted in Int'l Appln. No. PCT/EP2021/054094(May 25, 2021).
Int'l Prelim. Exam. Report (Form PCT/IPEA/4090) conducted in Int'l Appln. No. PCT/EP2021/054094(Aug. 25, 2022).

* cited by examiner

ARRANGEMENT OF AN ELECTRIC MOTOR HAVING AN ENCODER

The present invention relates to an electric motor which can be connected to a control unit in order to receive an actuating signal from the control unit. Furthermore, the present invention relates to an arrangement made up of an electric motor according to the invention, a control unit, an encoder, an encoder cable, and a connecting cable. In addition, the present invention relates to a method for operating an electric motor, wherein an encoder signal from an encoder is transmitted to a control unit, and wherein the control unit determines an actuating signal using the encoder signal and sends said actuating signal to the electric motor.

Electric motors, in particular servomotors, are often used in industrial systems, in particular in machine tools, packaging machines, industrial robots, etc. A controlled variable of an electric motor is controlled by a control unit by specifying an actuating signal. In order to enable control, at least one encoder is required which delivers an encoder signal that is fed back to the control unit. It is also possible to use a plurality of encoders, for example a master encoder and one or more slave encoders. The master encoder is often integrated in the electric motor (master), but the slave encoder is arranged on a slave and arranged remotely from the electric motor. A (slave) encoder is therefore arranged on the slave, for example a roller connected to the electric motor, with a cable running from the slave to the control unit sending an encoder signal directly to the control unit. Instead of this master-slave combination, a single encoder which is arranged externally of the electric motor can also be provided, for example.

The control unit processes the encoder signal and uses it to calculate an actuating variable, which is sent to the electric motor as an actuating signal. This results in very complex cabling; in particular, adding, removing, or replacing encoders is particularly complex due to the long cable connections between the encoders and the control unit.

It is therefore an object of the present invention to reduce the cabling complexity required for an electric motor having an encoder.

According to the invention, this object is achieved by the electric motor having an encoder port which is designed to receive an encoder signal from an encoder, with the electric motor having a signal port which is designed to transmit the encoder signal to the control unit. In an arrangement consisting of an electric motor according to the invention, a control unit, an encoder, an encoder cable, and a connecting cable, the encoder port can be connected to the encoder via the encoder cable in order to receive the encoder signal from the encoder, and the signal port of the electric motor can be connected to the control unit via the connecting cable in order to transmit the encoder signal to the control unit.

The object is also achieved by a method in which the encoder signal is transmitted from the encoder to the electric motor and the encoder signal is transmitted from the electric motor to the control unit.

Thus, according to the invention, the encoder is not connected directly to the control unit via a cable, but is connected to the electric motor, preferably via an encoder cable. In particular, a servomotor can be provided as the electric motor. The encoder signal is also sent from the electric motor to the control unit. The control unit processes the encoder signal and uses it to determine an actuating variable, which in turn is transmitted to the electric motor. Since the encoder is connected to the electric motor and not directly to the control unit, the cabling is simplified, especially when the encoder is positioned close to the electric motor and further away from the control unit. Connecting the encoder to the encoder port of the electric motor provides a modular, simpler connection of control unit, electric motor, and encoder, with the electric motor forming the center. This allows encoders to be easily replaced, removed, or added.

The signal port is preferably designed to forward the encoder signal as such to the control unit. This means that the encoder signal from the electric motor is looped through and forwarded to the control unit unchanged. Alternatively, the encoder signal can also be processed (e.g. modulated onto a suitable carrier) and thus transmitted to the control unit.

The electric motor can be designed to send an additional encoder signal from an additional encoder to the control unit. In this way, in addition to the encoder signal, the additional encoder signal can also be sent from the electric motor to the control unit. The control unit processes the encoder signal and the additional encoder signal and uses them to determine the actuating variable, which in turn is transmitted to the electric motor. In particular, the encoder can be a slave encoder and the additional encoder can be a master encoder.

The additional encoder can be integrated in the electric motor. The additional encoder signal is therefore available directly at the electric motor and can be transmitted from the electric motor to the control unit. A resolver, an incremental encoder, an absolute encoder, etc., for example, can be provided as the additional encoder, in particular if the additional encoder is integrated in the electric motor. A position can be determined by the additional encoder as an additional encoder signal, for example.

The signal port is preferably designed to transmit the additional encoder signal to the control unit. In this way, not only the encoder signal, but also the additional encoder signal is transmitted to the control unit through the signal port.

A connecting cable can be connected to the signal port of the electric motor and to the control unit in order to transmit the encoder signal and the additional encoder signal to the control unit via the connecting cable. In this way, both the encoder signal and the additional encoder signal can be transmitted to the control unit via a common signal port and a common connecting cable connected thereto, which reduces the cabling complexity.

If the signal port is designed to transmit the encoder signal and the additional encoder signal to the control unit, then in an arrangement consisting of the electric motor, the control unit, the encoder, the additional encoder (which can also be integrated in the electric motor), an encoder cable, and a connecting cable, the encoder port can be connected to the encoder via the encoder cable in order to receive the encoder signal from the encoder, and the signal port can be connected to the control unit via the connecting cable in order to transmit the encoder signal and the additional encoder signal to the control unit.

The signal port is preferably designed to forward the additional encoder signal as such to the control unit. This means that the additional encoder signal is forwarded to the control unit unchanged (if the additional encoder is not integrated in the electric motor, the additional encoder signal is looped through from the electric motor to the control unit). Alternatively, the additional encoder signal can also be processed (e.g. modulated onto a suitable encoder carrier signal) and thus transmitted to the control unit.

It is particularly advantageous for the encoder signal and the additional encoder signal to be transmitted to the control unit via an encoder signal line of the connecting cable. This can be done by modulating the encoder signal (and the additional encoder signal) onto a common encoder carrier signal.

The signal port can be designed to receive the actuating signal from the control unit.

The actuating signal is preferably transmitted from the control unit to the electric motor via the connecting cable.

If the signal port is designed to transmit the encoder signal to the control unit and to receive the actuating signal from the control unit, then in an arrangement consisting of the electric motor, a control unit, an encoder, an encoder cable, and a connecting cable, the encoder port can be connected to the encoder via the encoder cable in order to receive the encoder signal from the encoder, and the signal port of the electric motor can be connected to the control unit via the connecting cable in order to transmit the encoder signal to the control unit and receive an actuating signal from the control unit.

If the signal port is designed to transmit the encoder signal and the additional encoder signal to the control unit and to receive the actuating signal from the control unit, then in an arrangement consisting of the electric motor, the control unit, the additional encoder (which can also be integrated in the electric motor), an encoder, an encoder cable, and a connecting cable, the encoder port can be connected to the encoder via the encoder cable in order to receive the encoder signal from the encoder, and the signal port of the electric motor can be connected to the control unit via a connecting cable in order to transmit the encoder signal and the additional encoder signal to the control unit and receive an actuating signal from the control unit.

The cabling complexity can thus be reduced further. If the encoder signal, the additional encoder signal, and the actuating signal are routed via the same connecting cable, for example via a connecting cable with twin leads, only one connecting cable is required between the control unit and the electric motor. Only an additional encoder cable between the encoder and the electric motor for transmitting the encoder signal from the encoder to the electric motor is required. If a twin lead is formed by two wires in the connecting cable, signals are transmitted as voltage between the two wires.

The encoder cable can also be designed as a hybrid cable and can also transmit additional signals as well as the encoder signal.

Figure 1B:
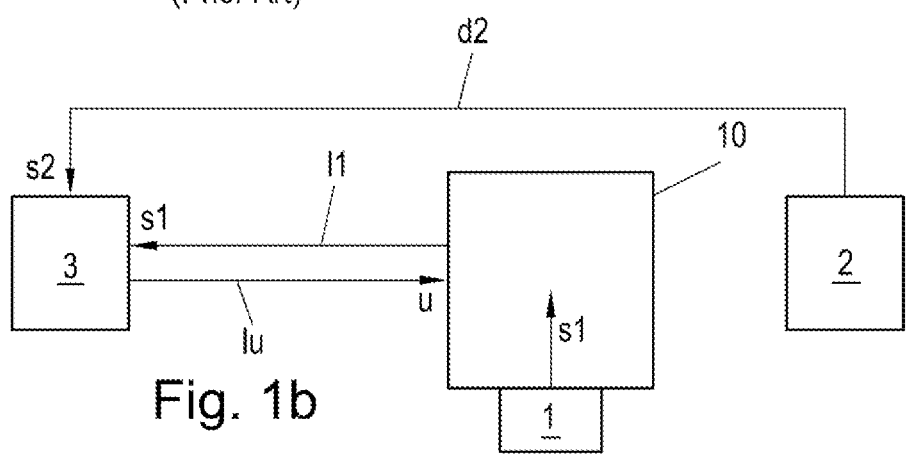
Figure 2A:
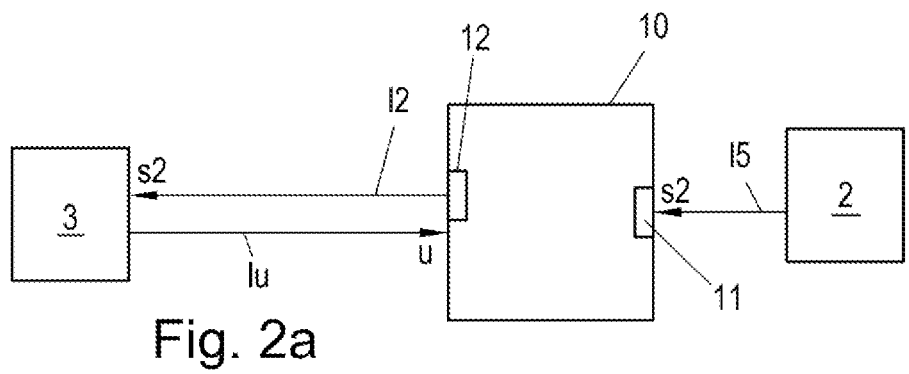
Figure 2B:
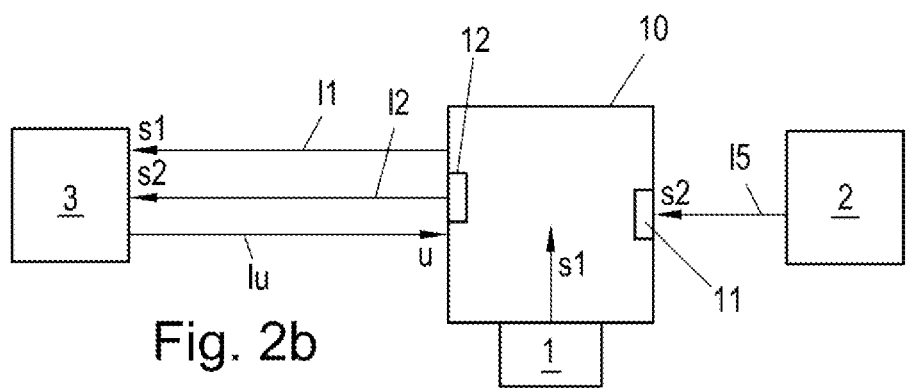
Figure 3:
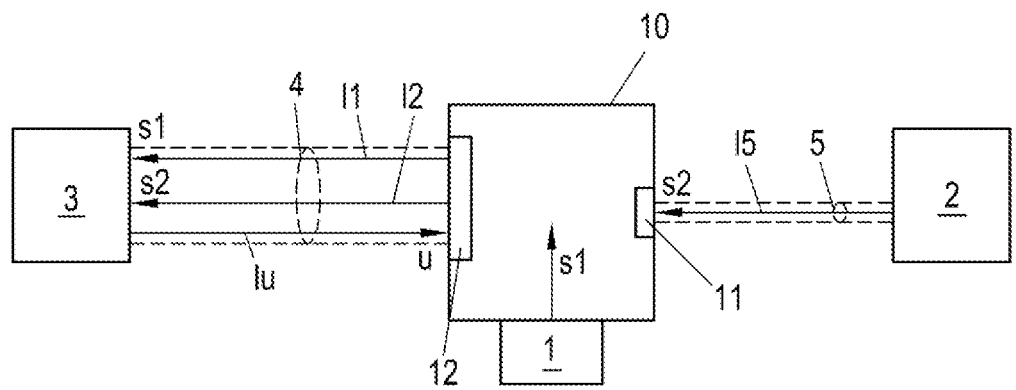
Figure 4:
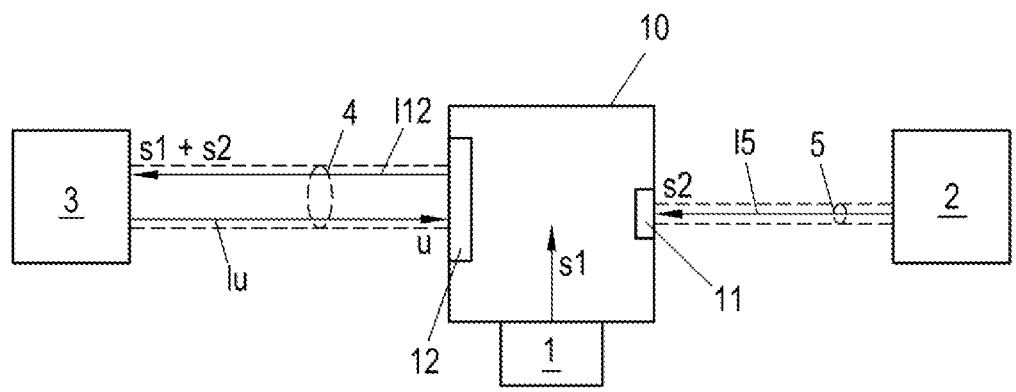

The present invention is described below in greater detail with reference to FIG. 1a to 4 which show schematic and non-limiting advantageous embodiments of the invention by way of example. In the drawings:

FIG. 1a shows an arrangement consisting of an electric motor, a control unit, and an encoder according to the prior art, FIG. 1b shows the arrangement with an additional encoder, FIG. 2a shows an arrangement according to the invention consisting of an electric motor, a control unit, and an encoder, FIG. 2b shows the arrangement with an additional encoder, FIG. 3 shows a preferred embodiment, and FIG. 4 shows a particularly preferred embodiment.

FIG. 1a shows an arrangement consisting of an electric motor 10 together with a control unit 3 and an encoder 2 known from the prior art. The encoder 2 sends an encoder signal s2 directly to the control unit 3 via a direct line d2. The encoder signal s2 can also be modulated onto an encoder carrier and transmitted via the direct line d2. Using the encoder signal s2, the control unit 3 calculates an actuating variable, which is sent as an actuating signal u via an actuating signal line lu to the electric motor 10 in order to regulate a controlled variable, for example a torque or a speed, of the electric motor 10.

FIG. 1b shows the arrangement from FIG. 1a, with an additional encoder 1, here integrated in the electric motor 10, also being provided. The additional encoder 1 provides the electric motor 10 with an additional encoder signal s1. In this case, the additional encoder 1 can act as a master encoder and the encoder 2 can act as a slave encoder, with the electric motor 10 serving as the master. A slave (e.g. a roller connected to the electric motor 10) is not shown in FIG. 1b. The additional encoder signal s1 is also sent from the electric motor 10 to the control unit 3 via an additional encoder signal line l1, with the additional encoder signal s1 being able to be transmitted as such via the additional encoder signal line l1; or processed first (e.g. modulated onto an additional encoder carrier) and then (modulated on the additional encoder carrier) transmitted via the additional encoder signal line l1. The control unit 3 calculates the actuating variable using the encoder signal s2 and the additional encoder signal s1. As in the arrangement from FIG. 1a, the actuating variable is sent as an actuating signal u via an actuating signal line lu to the electric motor 10 in order to regulate a controlled variable, for example a torque or a speed, of the electric motor 10.

In contrast, FIG. 2a shows an arrangement according to the invention consisting of an electric motor 10 together with a control unit 3 and an encoder 2. Similarly to FIG. 1a and FIG. 1b, using an encoder signal s2, the control unit 3 calculates an actuating variable, which is sent as an actuating signal u via the actuating signal line lu to the electric motor 10 in order to regulate a torque and/or a speed, for example, of the electric motor 10.

According to the invention, however, the electric motor 10 has an encoder port 11 which is designed to receive the encoder signal u2 from the encoder 2. For this purpose, an encoder cable 5 with an encoder line l5 can be provided, which encoder cable connects the encoder 2 to the electric motor 10 (an encoder cable 5 is not shown in FIG. 2a).

Furthermore, the electric motor 10 has a signal port 12 which is designed to transmit the encoder signal s2 to the control unit 3. The encoder 2 thus generates the encoder signal s2. In contrast to FIG. 1, however, this is not transmitted directly to the control unit 3 via a direct line d2, but to the electric motor 10 via an encoder line l5. The electric motor 10 sends the encoder signal s2 to the control unit 3. This can be done by forwarding (i.e. looping through) the encoder signal s2 as such, i.e. unchanged, or by first processing (via a processing unit, preferably a modulation unit) the encoder signal s2 and transmitting it in processed form (e.g. modulated onto a suitable encoder carrier signal) to the control unit 3.

In contrast, FIG. 2b shows the arrangement from FIG. 2a, but with an additional encoder 1, preferably integrated in the electric motor 10, with the additional encoder 1 providing the electric motor 10 with an additional encoder signal s1. The additional encoder signal s1 is sent from the electric motor 10 to the control unit 3 via an additional encoder signal line l1. The control unit 4 thus calculates an actuating variable using the encoder signal s2 and the additional encoder signal u1, which is sent as an actuating signal u via the actuating signal line lu to the electric motor 10 in order to regulate a torque and/or a speed, for example, of the electric motor 10.

Additional encoders (not shown) can also be connected to the electric motor 10 via additional encoder lines and additional encoder signals can be transmitted to the electric motor 10. The electric motor 10 preferably also transmits the additional encoder signals to the control unit 3 in that the additional encoder signals are forwarded as such, i.e. unchanged, or are first processed and transmitted in processed form, preferably modulated onto an encoder carrier signal. The additional encoder signal s1 can be processed by an additional processing unit (preferably an additional modulation unit) or—if present—the processing unit (preferably the modulation unit) which is already provided for the processing (preferably modulation) of the encoder signal s2.

If the electric motor 10 is to be operated without the encoder 2, the encoder port 11 can be left free or closed with a cover. This is advantageous if the electric motor 10 also has an additional encoder 1, which is preferably integrated in the electric motor 10.

The encoder 2 can be designed as a slave encoder, and the additional encoder 1 can be designed as a master encoder. Slave encoders are preferably provided in order to detect a rotary movement as an encoder signal, with the control unit 2 controlling a linear or other kinematic movement and correspondingly calculating an actuating variable and sending it to the electric motor 10.

Linear shafts (spindle drives) to which a linear measuring system is attached, for example, can be provided as encoders, particularly when designed as slave encoders. A winding temperature sensor of the electric motor 10, for example, can be provided as an additional encoder 1 (in particular designed as a master encoder), it being possible for a winding temperature of the electric motor 10 to be provided as an additional encoder signal s1. For example, the electric motor 10 (master) can be connected to a pressure roller (slave) via a gear system, for example, with the encoder 2 (as a slave encoder) being arranged on the pressure roller. The encoder 2 sends a speed or an angle of rotation, for example, of the pressure roller as an encoder signal s2 to the electric motor 10, which forwards the encoder signal s2 to the control unit 4 via the encoder signal line l2. If an additional encoder 1 is provided, as shown in FIG. 2b, the electric motor 10 can also forward the additional encoder signal s1 to the control unit 4, for example via an additional encoder signal line l1. The control unit 4 can specify a target speed or a target angle of rotation as an actuating variable, for example by means of cascade control. The actuating variable is sent as an actuating signal u via the actuating signal line lu to the electric motor 10 in order to regulate the torque and/or the speed, for example, of the electric motor 10.

FIG. 3 shows an advantageous embodiment. Here, the signal port 12 is designed to transmit the encoder signal s2 and the additional encoder signal s1 to the control unit 3. The connecting cable 4 correspondingly comprises an encoder signal line l2 and an additional encoder signal line l1 in order to transmit the encoder signal u2 together with the additional encoder signal s1 via the connecting cable 4. Furthermore, the signal port 12 is designed to receive the actuating signal u from the control unit 3; the connecting cable 4 therefore also includes the actuating signal line lu in order to transmit the control signal u from the control unit 3 to the electric motor 10. In order to transmit the encoder signal s2 to the electric motor 10, an encoder cable 5 with an encoder line l5 is preferably provided, which encoder cable is connected to the encoder 2 and the encoder port 11 of the electric motor 10 and thus connects the encoder 2 to the electric motor 10.

The encoder signal u2 and/or the actuating signal u can, of course, also be transmitted to/from the control unit 3 via separate connecting cables, which of course increases the cabling complexity in comparison with transmission via a common connecting cable 4.

A particularly advantageous embodiment is shown in FIG. 4. Here, the encoder signal s2 and the additional encoder signal s1 are transmitted together via an encoder signal line l12 of the connecting cable 4. This can be done by modulating the encoder signal s2 and the additional encoder signal s1 onto an encoder carrier signal of the encoder signal line l12 (using a common modulation unit or two separate modulation units). Therefore, only one actuating signal line lu and one encoder signal line l12 are required in the connecting cable 4. A two-wire connection, for example, can be provided as an encoder signal line l12.

The invention claimed is:

1. An electric motor connectable to a control unit in order to receive an actuating signal from the control unit, the electric motor comprising:
   a signal port which is designed to transmit an encoder signal of an encoder integrated in the electric motor to the control unit,
   an encoder port which is designed to receive a second encoder signal from a second encoder arranged remotely from the electric motor,
   wherein the signal port is designed to transmit the second encoder signal of the second encoder arranged remotely from the electric motor to the control unit.

2. The electric motor according to claim 1, the signal port is designed to forward the second encoder signal of the second encoder arranged remotely from the electric motor to the control unit.

3. The electric motor according to claim 1, the signal port is designed to forward the encoder signal of the encoder integrated in the electric motor to the control unit is unchanged.

4. The electric motor according to claim 1, the signal port is designed to receive the actuating signal from the control unit.

5. An arrangement consisting of:
   the electric motor according to claim 1,
   a control unit,
   a second encoder arranged remotely from the electric motor,
   an encoder cable, and
   a connecting cable,
   wherein the encoder port is connected via the encoder cable to the second encoder arranged remotely from the electric motor in order to receive a second encoder signal from the second encoder arranged remotely from the electric motor, and
   wherein the signal port is connected via the connecting cable to the control unit in order to transmit the encoder signal of the second encoder arranged remotely from the electric motor and the encoder signal of the encoder integrated in the electric motor to the control unit.

6. The arrangement according to claim 5, wherein the signal port receives the actuating signal via the connecting cable.

7. A method for operating an electric motor, comprising:
   transmitting an encoder signal from an encoder integrated in the electric motor via a connecting cable to a control unit, wherein the control unit uses the encoder signal to determine an actuating signal and sends said actuating signal to the electric motor,
   transmitting a second encoder signal of a second encoder arranged remotely from the electric motor to the electric motor and from the electric motor via the connecting cable to the control unit, and wherein the control unit determines an actuating signal at least one of using the encoder signal of the second encoder arranged remotely from the electric motor or using the encoder signal of the encoder integrated in the electric motor and sends said actuating signal to the electric motor.

8. The method according to claim 7, the electric motor forwards the second encoder signal of the second encoder arranged remotely from the electric motor to the control unit unchanged.

9. The method according to claim 7, the second encoder signal of the second encoder arranged remotely from the electric motor and the encoder signal of the encoder integrated on the electric motor are transmitted via an actuating signal line of the connecting cable to the control unit.

10. The method according to claim 7, wherein the actuating signal is transmitted via the connecting cable from the control unit to the electric motor.

11. An arrangement comprising:
the electric motor according to claim 1,
a control unit,
a second encoder arranged remotely from the electric motor,
an encoder cable, and
a connecting cable,
wherein the encoder port is connected via the encoder cable to the second encoder arranged remotely from the electric motor in order to receive a second encoder signal from the second encoder arranged remotely from the electric motor, and
wherein the signal port is connected via the connecting cable to the control unit in order to transmit the encoder signal of the second encoder arranged remotely from the electric motor and the encoder signal of the encoder integrated in the electric motor to the control unit.

12. The arrangement according to claim 11, wherein the signal port receives the actuating signal via the connecting cable.

* * * * *